United States Patent
Kumar et al.

(10) Patent No.: US 12,438,830 B2
(45) Date of Patent: Oct. 7, 2025

(54) PROVIDING HIGH ASSURANCE OF END-TO-END CPRI CIRCUIT IN A HIGH JITTER PACKET BASED FRONTHAUL NETWORK

(71) Applicant: Cisco Technology, Inc., San Jose, CA (US)

(72) Inventors: Manoj Kumar, Karnataka (IN); Somesh Ubhayanandan Malimath, Bangalore (IN); Prashant Anand, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 17/824,077

(22) Filed: May 25, 2022

(65) Prior Publication Data

US 2023/0388252 A1 Nov. 30, 2023

(51) Int. Cl.
*H04L 12/66* (2006.01)
*G06F 11/08* (2006.01)
(Continued)

(52) U.S. Cl.
CPC .............. *H04L 49/90* (2013.01); *H04L 47/34* (2013.01); *H04L 69/22* (2013.01); *H04L 69/28* (2013.01)

(58) Field of Classification Search
CPC ......... H04L 49/90; H04L 12/66; H04L 43/50; H04L 47/34; H04L 1/0057; H04L 1/0083;
(Continued)

(56) References Cited

U.S. PATENT DOCUMENTS 5,428,629 A * 6/1995 Gutman ................ H04L 1/0057
714/776
9,997,167 B2 * 6/2018 Reuschl ................ G10L 19/04
(Continued)

FOREIGN PATENT DOCUMENTS

WO 2012106910 8/2012

OTHER PUBLICATIONS

Anand et al., Equalizing Asymmetry Delay For Aligning Signals on Air Interface in 5G/L TE-A Xhaul/Fronthaul C-RAN Network, Technical Disclosure Commons, Jun. 9, 2021, pp. 1-16 (Year: 2021).*

(Continued)

*Primary Examiner* — Edan Orgad
*Assistant Examiner* — Vanneilian Lalchinthang
(74) *Attorney, Agent, or Firm* — Polsinelli P.C.

(57) ABSTRACT

The present disclosure is directed to ensuring end-to-end packet delivery in a Common Public Radio Interface (CPRI) circuit with a high jitter packet-based fronthaul network. In one aspect, a method includes determining, at a de-mapper, that at least one data packet scheduled to be played out is not available; inserting an idle data packet into a buffer at the de-mapper for each data packet that is not available; continuously monitoring a packet playout process to (1) identify last valid data packet played out, (2) a number of idle data packets inserted, and (3) a number of data packets currently stored in the buffer; and determining that insertion of idle data packets into the buffer should be stopped and a valid data packet to be played out; wherein inserting the idle data packet and the valid data packet ensure link integrity in data packet transmission between two network elements.

20 Claims, 7 Drawing Sheets

(51) Int. Cl.
*H04L 47/34* (2022.01)
*H04L 49/90* (2022.01)
*H04L 69/22* (2022.01)
*H04L 69/28* (2022.01)
*H04W 4/00* (2018.01)
*H04W 40/02* (2009.01)

(58) Field of Classification Search
CPC ....... H04L 69/22; H04L 69/28; H04L 45/123; H04W 28/22; H04W 56/002; H04W 56/001; H04W 28/04; H04W 88/085; H04W 88/182; H04W 40/02; H04J 3/0638; H04J 3/0647; H04J 3/0667; H04J 3/0682
USPC ........................................................ 370/412
See application file for complete search history.

(56) References Cited

U.S. PATENT DOCUMENTS

| | | | | |
|---|---|---|---|---|
| 10,411,821 | B2* | 9/2019 | Meyer | H04B 10/27 |
| 11,595,461 | B2* | 2/2023 | Annamraju | H04L 65/80 |
| 2003/0093267 | A1* | 5/2003 | Leichtling | G10L 19/167 |
| | | | | 704/E19.048 |
| 2009/0147679 | A1* | 6/2009 | Gusat | H04L 47/50 |
| | | | | 370/232 |
| 2010/0284397 | A1* | 11/2010 | Poulin | H04L 12/66 |
| | | | | 370/352 |
| 2013/0100948 | A1* | 4/2013 | Irvine | H04W 88/085 |
| | | | | 370/350 |
| 2015/0109925 | A1* | 4/2015 | Kullangal Sridhara | |
| | | | | H04L 65/80 |
| | | | | 370/235 |
| 2017/0064661 | A1* | 3/2017 | Katagiri | H04J 3/0667 |
| 2021/0006386 | A1* | 1/2021 | Qi | H04J 3/0676 |
| 2021/0075532 | A1* | 3/2021 | Anand | H04J 3/0661 |
| 2021/0360555 | A1 | 11/2021 | Anand et al. | |
| 2022/0039034 | A1* | 2/2022 | Ma | H04W 40/02 |

OTHER PUBLICATIONS

Bjørnstad et al., "Minimizing Delay and Packet Delay Variation in Switched 5G Transport Networks," IEEE, vol. 11, No. 4, Apr. 23, 2019, pp. 1-11.

Anand et al., Equalizing Asymmetry Delay For Aligning Signals on Air Interface in 5G/LTE-A Xhaul/Fronthaul C-RAN Network, Technical Disclosure Commons, Jun. 9, 2021, pp. 1-16.

* cited by examiner

PROVIDING HIGH ASSURANCE OF END-TO-END CPRI CIRCUIT IN A HIGH JITTER PACKET BASED FRONTHAUL NETWORK

TECHNICAL FIELD

The present disclosure relates to communication systems, and in particular, to systems and methods for ensuring end-to-end packet Common Public Radio Interface (CPRI) circuit delivery through a high Jitter packet based fronthaul network.

BACKGROUND

Mobile networking architectures have grown increasingly complex in communication environments. In particular, access network configurations for used in mobile networking architectures have become more complex. These complexities have elevated the importance of improving the efficiency and reliability of communications among access network elements such as a radio equipment controller and radio equipment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
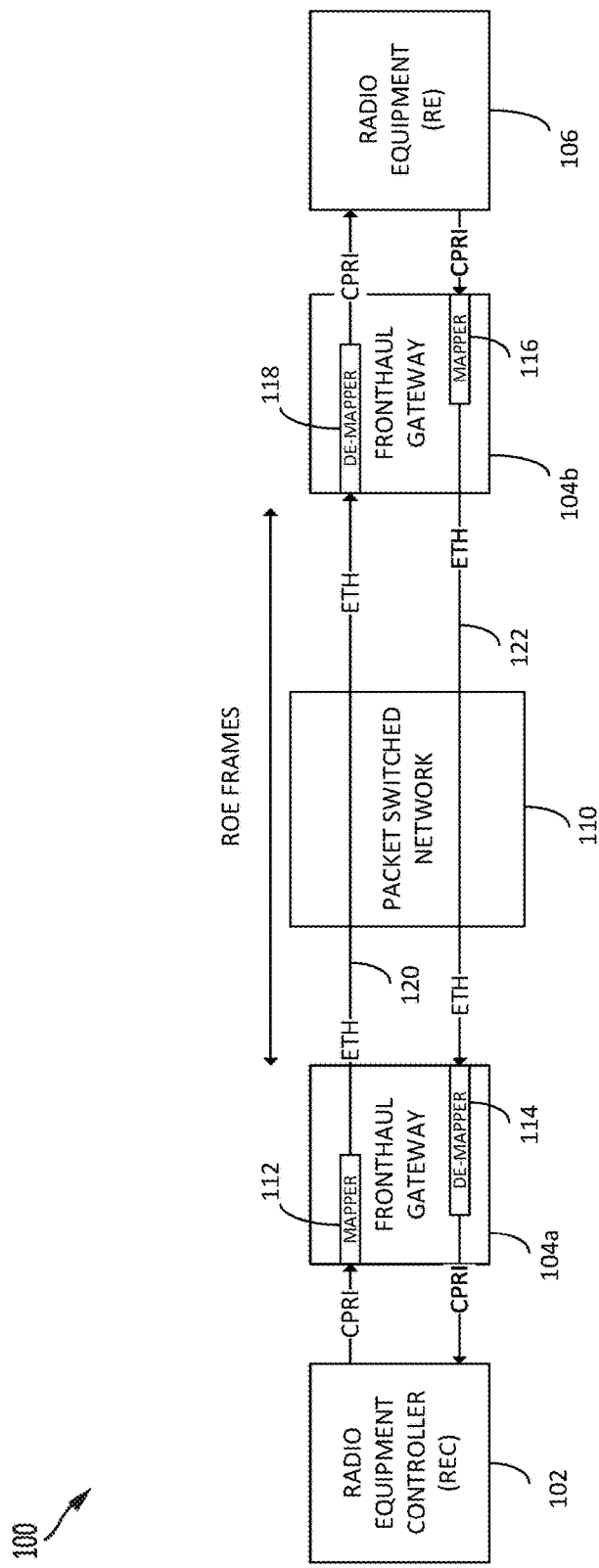
FIG. 1 is a block diagram of a fronthaul network in which techniques of the present disclosure may be implemented, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media directed to ensure CPRI frame integrity and CPRI stream integrity (which is always on at a constant bit rate with a defined frame structure) in a packet based fronthaul network, in which, CPRI stream may be exchanged between a Radio Equipment Controller (REC) such as a Base Band Unit, and a Radio Element (RE) at the other end, such as a Remote Element (RE) at the other end, such as a Remote Radio Headend (RRH) through a packet-based transport. Each of the REC and the RE may have an associated fronthaul gateway. At one end (e.g., one of the fronthaul gateways), the CPRI traffic (from the REC or the RE) is packetized or mapped in ethernet frames (RoE) and carried over a packet data network to the other fronthaul gateway. CPRI is Time Division Multiplexed protocol with a stringent delay requirement. At the other end, the other fronthaul gateway takes the CPRI traffic out from the ethernet frames or de-maps the same into CPRI frames before playing it out to the receiving component real CPRI end point (the other one of the REC or RE). The fronthaul gateways perform this mapping of CPRI traffic to Ethernet frames and de-mapping Ethernet frames to CPRI traffic, in both the directions.

As Ethernet frames are transported over physical layers, they may experience various types of delays and jitter that may result in packets being dropped and/or arrived at the receiving fronthaul gateway too early or too late. The techniques described in this disclosure ensure the integrity of reconstructed CPRI frames by accounting for lost or out-of-order arrival of RoE frames.

In one aspect, a method includes determining, at a de-mapper configured to receive data packets over a network, that at least one data packet scheduled to be played out is not available; inserting an idle data packet into a buffer at the de-mapper for each of the at least one data packet that is not available; continuously monitoring, at the de-mapper, a packet playout process to (1) identify last valid data packet played out, (2) a number of idle data packets inserted, and (3) a number of data packets currently stored in the buffer; and based on the continuous monitoring, determining that insertion of idle data packets into the buffer should be stopped and a valid data packet to be played out; wherein inserting the idle data packet and the valid data packet ensure link integrity in data packet transmission between two network elements in the network.

In another aspect, a size of the idle data packet is equal to a size of a Radio over Ethernet (RoE) frame and content of the idle data packet does not result in PCS errors on a Common Public Radio Interface (CPRI) link between the de-mapper and one of the two network elements.

In another aspect, the method further includes identifying the valid data packet to be played out.

In another aspect, the valid data packet is identified based on at least one of a sequence number or a timestamp associated with a corresponding ROE frame, and the sequence number or the timestamp is stored in a RoE header or a mapping table.

In another aspect, the method further includes detecting a buffer underrun at the de-mapper.

In another aspect, upon detecting the buffer underrun, the method further includes adjusting a re-timer output delay for the buffer using an average data packet delay obtained from an initial CPRI link establishment and an estimated fill time for the buffer.

In another aspect, the de-mapper is part of a fronthaul gateway that converts received Ethernet packets into CPRI packets to be played out at one of a Radio Control Equipment or a Radio Equipment.

In one aspect, a de-mapper of a fronthaul network includes one or more memories having computer-readable instructions stored therein; and one or more processors. The one or more processors are configured to execute the computer-readable instructions to determine that at least one data packet scheduled to be played out is not available; insert an idle data packet into a buffer at the de-mapper for each of the at least one data packet that is not available; continuously monitor, at the de-mapper, a packet playout process to (1) identify last valid data packet played out, (2) a number of idle data packets inserted, and (3) a number of data packets currently stored in the buffer; and based on the continuous monitoring, determine that insertion of idle data packets into the buffer should be stopped and a valid data packet to be played out; wherein insert the idle data packet and the valid data packet ensure link integrity in data packet transmission between two network elements in the network.

In one aspect, one or more non-transitory computer-readable media includes computer-readable instructions, which when executed by one or more processors of a de-mapper in a fronthaul network, cause the de-mapper to determine that at least one data packet scheduled to be played out is not available; insert an idle data packet into a buffer at the de-mapper for each of the at least one data packet that is not available; continuously monitor, at the de-mapper, a packet playout process to (1) identify last valid data packet played out, (2) a number of idle data packets inserted, and (3) a number of data packets currently stored in the buffer; and based on the continuous monitoring, determine that insertion of idle data packets into the buffer should be stopped and a valid data packet to be played out; wherein insert the idle data packet and the valid data packet ensure link integrity in data packet transmission between two network elements in the network.

Example Embodiments

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Internet Protocol (IP) addresses discussed herein and in the claims can include IP version 4 (IPv4) and/or IP version 6 (IPv6) addresses. For example, various Layer 1 (L1) and/or Layer 2 (L2) communications/operations may be referenced herein.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

In general, 3rd Generation Partnership Project (3GPP) mobile network architectures such as 3GPP Long Term Evolution (LTE) architectures, sometimes referred to as 4th Generation (4G)/LTE architectures, as well as 3GPP 5th Generation (5G) architectures can be implemented via a core network and one or more 3GPP access networks in which user equipment (UEs) connect to a core network via over-the-air Radio Frequency (RF) communications with radio units or radio equipment (RE) of the access networks. Some 3GPP access networks can be implemented in a configuration that includes a radio equipment controller (REC) that interfaces with the core network and also interfaces with one or more RE. Both the REC and RE are two basic building blocks of a radio base station. The REC is concerned with the Network Interface transport, the radio base station control and management as well as the digital baseband processing. The RE provides the analogue and radio frequency functions via a radio head such as filtering, modulation, frequency conversion and amplification or, more generally, RE serves as the air interface, to the user equipment.

In general, Common Public Radio Interface (CPRI) is a point-to-point technology that is based on a constant bit rate (CBR), always-ON bit-stream concept. In a traditional CPRI-based deployment, a REC and a RE follow the CPRI Specification and perform operations of a CPRI Master and a CPRI Slave, respectively.

Both the REC and RE are two basic building blocks of a radio base station. The REC generally operates to provide Network Interface transport, radio base station control and management, as well as digital baseband processing, whereas the RE provides the analog and radio frequency functions via a radio head such as filtering, modulation, frequency conversion and amplification or, more generally, RE serves as the air interface to one or more user equipment (UE). In some instances, a REC may also be referred to as a baseband unit (BBU). In some instances, a RE may also be referred to as a remote radio head (RRH) or a radio unit (RU).

Traditionally, a wireless fronthaul (also referred to as 'front haul') network may be implemented through CPRI over a point-to-point optical link. However, due to the bandwidth explosion of mobile networking architectures, such as Third Generation Partnership Project (3GPP) Fifth Generation (5G) architectures and/or Fourth Generation (4G)/Long Term Evolution (LTE) architectures, fronthaul networks are becoming packetized to gain from design advantages made possible through average rate/statistical multiplex (stat mux) gain and the cost effectiveness of packet-based (Ethernet-based) networks.

In packetized fronthaul networks, the REC and RE do not interact directly as the direct fiber connection can be replaced with a packet-based network (e.g., an Ethernet-based network) between the REC and RE. Hence, there may be intermediate nodes in such a packet-based network that may interface with other nodes of the packet-based network while also interacting with the actual CPRI end points (e.g., the REC and RE may be considered the actual CPRI end points).

Traffic for CPRI is a 100% duty cycle traffic in that it is an antenna flow just after digitization of Radio Frequency (RF) signals (e.g., In-phase and Quadrature (I/Q) samples) from a radio front end in which most of the base band processing will happen at a central location (e.g., at an REC). In general, CPRI-based fronthaul use cases may involve the following aspects:

1. RE derives the Frequency and Phase Synchronization from REC
2. Frequency is derived from a CPRI bit stream at RE in which clock/data recovery (CDR) and jitter attenuation (JA) can be used to clean noise from the CPRI bit stream, which will be used for carrier frequency generation on the air interface at the RE.
3. Phase synchronization is overloaded term; it is important to emphasize that the CPRI synchronization plane provides frame timing alignment, not strictly clock phase alignment. Frame alignment, as referred to herein, may encompass means Hyper Frame Number (HFN) and eNodeB Basic Frame Number (BFN) counter alignment with an REC (e.g., for Z.64, Z.128, Z.192 (4-bits) control words).
4. Phase is used to generate slot interrupt (1 millisecond (msec), transmission time interval (TTI)), sub-slot interrupt (0.5 msec), and frame interrupt (10-msec).

FIG. 1 is a block diagram of a fronthaul network in which techniques of the present disclosure may be implemented, according to some aspects of the present disclosure. Fronthaul network 100 includes a REC 102, fronthaul gateway (FH-GW) node 104*a*, FH-GW node 104*b*, and a RE 106. Fronthaul network 100 may also include a packet-switched network 110.

For fronthaul network 100, FH-GW nodes 104*a* and 104*b* at ends of the packet-switched network 110 are synchronized with respect to frequency, phase, and Time of Day (ToD) using Synchronous Ethernet (SYNCE) and Precision Time Protocol (PTP) 1588 version 2 (1588v2) synchronization techniques. REC 102 and RE 106 are also tracking to the same reference frequency, phase and time with REC 102 being synchronized via SYNCE and PTP 1588v2 with IWF nodes 104 and RE 106 being synchronized via CPRI (e.g., derived from the CPRI bit stream, as discussed above). Thus, it is to be understood that REC 102, RE 106, and IWF nodes 104*a* and 104*b* are referenced to the same time scale for techniques presented herein.

Although not shown, REC 102 may further interface or otherwise communicate with a 3GPP mobile core network (not shown), such as any combination of a 3GPP 4G/LTE mobile core network and/or a 5G mobile core network. Further, RE 106 may further interface or otherwise communicate with one or more user equipment (UE) via over-the-air Radio Frequency (RF) communications.

FH-GW nodes 104*a* and 104*b* may be considered Ethernet nodes having capabilities to perform CPRI interactions with the REC and RE. The FH-GW nodes 104*a* and 104*b* may also perform operations to map a CPRI bit stream to RoE frames and operations to de-map RoE frames to a CPRI bit stream before playing out the CPRI bit stream towards a given CPRI end points (e.g., REC or RE). Stated differently, FH-GW nodes 104*a* and 104*b* may provide CPRI to Ethernet adaptation operations within fronthaul network 100.

As shown in FIG. 1, FH-GW nodes 104*a* and 104*b* each may have a mapper for converting CPRI bit stream into Ethernet packets (RoE frames) and a de-mapper for converting RoE frames to CPRI bit stream. More specifically, FH-GW node 104*a* has a mapper 112 and a de-mapper 114. Similarly, FH-GW 104*b* has mapper 116 and de-mapper 118.

Thus, in at least one embodiment, at least one CPRI interface element or port may be configured for each of FH-GW node 104*a* and FH-GW node 104*b* to facilitate CPRI communications with a CPRI end point (i.e., one of REC 102 or RE 106. In at least one embodiment, at least one Ethernet interface element or port may also be configured for each of FH-GW node 104a and FH-GW node 104b to facilitate communications via packet-switched network 110.

As an example, a CPRI bit stream may originate from REC 102 and arrive at mapper 111 of FH-GW 104a, where it is mapped to RoE frames and transmitted over network 110 to de-mapper 118 at FH-GW node 104b. At de-mapper 118, received RoE frames are then de-mapped and corresponding CPRI bit streams are reconstructed to be played out at RE 106. This flow is shown as flow 120 in FIG. 1. In this example, FH-GW 104a may be considered an ingress node and FH-GW node 104b may be considered an egress node for transmissions from FH-GW node 104a toward FH-GW node 104b via packet-switched network 110. Using known or to be developed techniques, at mapper 112, FH-GW node 104a may map the received CPRI bit stream into RoE frames (a packetized radio flow), include a time stamp in a RoE header of the frames, and transmit the frames to an opposite end FH-GW node 104b via packet-switched network 110. The receiving FH-GW node 104b may de-map, at de-mapper 118, the CPRI bit stream from the RoE frames and transmit (also referred to as 'play out') the CPRI bit stream toward RE 106 using known or to be developed techniques.

Similarly, example flow 122 may be the same as flow 120 except that CPRI bit stream starts at RE 106, arrives at mapper 116 at FH-GW 104b where it is mapped to RoE frames, transmitted over network 110 and arrives at de-mapper 114 of FH-GW 104a where the CPRI bit streams are reconstructed to be played out at REC 102.

The IEEE 1914.3 Specification describes methods to map a CPRI bit stream into RoE packets or frames and vice-versa to de-map RoE frames into a CPRI bit stream. Consider for techniques presented herein that the structure agnostic mode is used for mapping CPRI bit streams into RoE frames. While the IEEE 1914.3 Specification describes mapping/de-mapping methods, it does not specify any method for filtering PDV that may be introduced by a packet-switched network; rather, such procedures may be implementation specific. The IEEE 1914.3 Specification does provide a RoE frame format including a RoE header. Techniques presented herein may provide for the ability to flexibly use certain bits of a RoE header to achieve PDV filtering within fronthaul network.

As RoE frames are transmitted over network 110 to de-mapper 114 and/or de-mapper 118, they may experience packet delay variations (PDV)/jitter due to various factors such as queuing at multiple points through the path over network 110, among others. The jitter can be due to various known or to be developed reasons including, but not limited to, buffering of packets at different points, higher utilization in xHAUL application, different arbiters in packet processing pipeline, clock domain transfer, digital logic, jitter of 114.4 ns over a 10GE interface, jitter of 11.44 ns on 100GE interface, self-inference due to other equal CPRIoE flows, etc. Jitter can be additive or compensating across multiple hops from Ingress CPRIoE/RoE mapper to egress CPRI to Ethernet to CPRIoE/RoE de-mapper.

Accordingly, each of de-mappers 114 and 118 include a buffer to accumulate the arriving packets and plays them out after cleaning the PDV, jitter, etc. More specifically, de-mappers 114 and/or 118 play the CPRI payload from these frames out on the CPRI link (any one of links between REC 102 and mapper 112, REC 102 and de-mapper 114, RE 106 and mapper 116, and/or RE 106 and de-mapper 118) one by one as per their sequence number or their presentation time. A re-timer buffer instead of a de-jitter buffer may be used for this purpose. In a de-jitter buffer, the buffer fill levels are tracked whereas in the re-timer buffer the frame is re-timed for playout as per their origin time by ensuring a fixed delay for all packets from their origin time (i.e. the packets which arrived early end up staying in the buffer for longer than the packets which come with an average delay. Similarly the packets which arrived late than the average delay packets end up staying for smaller duration in the buffer). Using a re-timer buffer, a mapper (e.g., mapper 112 and/or mapper 116) may add a timestamp (Ingress TS) in a frame after mapping CPRI data to RoE frame and the de-mapper (e.g., de-mapper 114 and/or de-mapper 118) may check the arrival timestamp (egress TS) on receiving the packet. The de-mapper may also determine the delay (packet delay) experienced by the packet in reaching the de-mapper. The de-mapper then uses the packet delay against a fixed delay (re-timer output delay) to compensate for the difference by keeping the packet in buffer for the difference time. Accordingly, each packet gets played out after a 'fixed' delay from their origin time where the constant bit rate always on CPRI data is mapped to the RoE frame.

Figure 2:
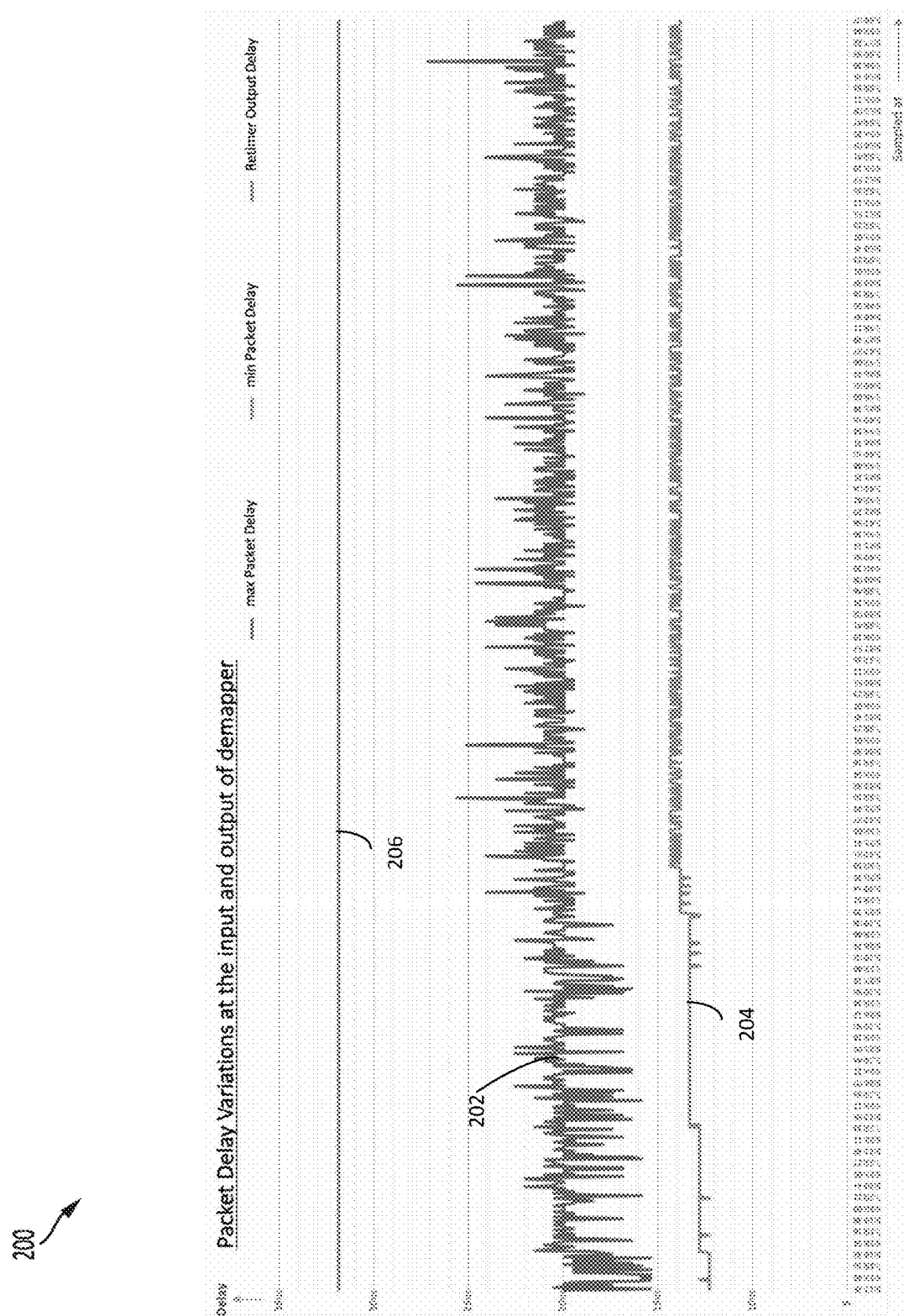
FIG. 2 illustrates an example plot of packet delay variations at input and output of a de-mapper of a FH-GW of a fronthaul network of FIG. 1, according to some aspects of the present disclosure.

FIG. 2 illustrates an example plot of packet delay variations at input and output of a de-mapper of a FH-GW of a fronthaul network of FIG. 1, according to some aspects of the present disclosure. Output 200 of FIG. 2 illustrates three data points. First data point is maximum packet delay shown via line 202, minimum packet delay shown via line 204 and re-timer output delay shown via line 206.

A peak-to-peak jitter of the order of around 20 μs can be seen in FIG. 2. Peak-to-peak jitter may be determined by looking at peak of minimum packet delay and peak of maximum packet delay. Re-timer output delay is almost constant.

Due to jitter and PDV, a number of problems may occur. One such problem can be packet loss before or at a de-mapper such as de-mappers 114 and/or 118. One such problem is that high peak-to-peak jitter experienced by the packets before they reach a de-mapper and the limited buffer in a de-mapper means that eventually some packets will occasionally be dropped. In simpler words, assuming a fixed size buffer available on a de-mapper, as and when the ingress packet rate is higher than what the buffer can accommodate and the rate at which the frames get egressed out, there is a chance of packet/frame loss on the de-mapper. For example, as only limited buffers (of the order for 20-30 μs) can be available on a de-mapper (e.g., for CPRI 8 (i.e., 10.1376 Gbps rate), by a sample framing calculation, 40 Kilo Bytes buffer is needed to handle traffic worth of 30 μs) and jitter can be additive as well as negative, maximum jitter cleaning capability is reduced even further (e.g., if a circular buffer is used, the maximum jitter that can be cleaned will be around half of the size of buffer.)

Such a frame loss means loss in the end-to-end CPRI data as well as interruption in the framing structure of the CPRI which should be maintained per the time domain characteristics of the CPRI protocol. This type of interruption in the CPRI framing will result in CPRI link faults such as Loss of Framing (LoF) and Loss of Signal (LoS), which further triggers re-establishment of end-to-end CPRI link—a major event for the end-to-end 4G, 5G radio cell connectivity.

Another jitter/PDV induced problem can be the early/late arrival of RoE frames at a de-mapper such as de-mappers 114 and 118. In one instance, some packets may arrive late and thus cannot be accommodated into the re-timer buffer as per the occupancy of the buffer and current playout frame, even when a circular buffer is used (e.g., packets may arrive later than their playout time on the CPRI link or their time for playout was in past.) This late arrival may typically occur in a 'silence followed by a burst' situation due to latency introduced in the network or due to pile up of packets in buffers prior to arriving at a de-mapper buffer. The piled-up packets could be sent to de-mapper buffer at higher speeds later on (i.e. there will be underflow of the buffer due to the silence and sudden burst of packets which will get dropped as these need not be played out currently).

In another instance, RoE frames may arrival too early at a de-mapper. Occasionally (even when a circular buffer is used) there can still be some packets arriving at the de-mapper earlier than usual and cannot be accommodated in the limited buffer and hence will be dropped (i.e., the packets arrived so early such that previously arrived packets are yet to be played out and cannot be dropped to accommodate these newly arrived frames). When these packets are dropped, then there will not be valid frame(s) for playout in near future causing occasional potential underflow on the buffer when this happens to a sequence of packets (burst). This problem can be caused by 'burst followed by silence.' One approach to address this problem is by enabling proactive flow control mechanisms to the previous blocks in the path to prevent the drops. However, doing so has an effect on the one-way latency for the link. Flow control assertion at the beginning leads to packet build up at the buffers before de-mapper during the CPRI link bring-up or run time re-establishment which may add to the Packet Delay and hence the Re-timer output delay. This in-turn affects the 100 µs one-way delay requirement for the end-to-end CPRI link. Furthermore, additional buffers in the de-mapper to accommodate slightly higher than the peak-to-peak jitter is another potential solution albeit a costly due to high buffering needs at every de-mapper port.

Whether frames arrive too early or too late, the actual data which is expected by the CPRI end point (e.g., REC 102 or RE 106) as per its time domain characteristics for some basic frames (which were packetized in the RoE frame) will not be delivered and if not handled can lead to a hole/gap in the CPRI framing data. Also, if the handling is not proper, it can lead to an expansion (extra frame playout) in the CPRI framing data. All this can also lead to framing loss at the CPRI end point triggering a re-establishment of CPRI link.

Another jitter/PDV induced problem can be post occurrence of underrun on de-mapper's re-timer buffer. A solution to address such post occurrence underrun should satisfy three constraints, namely, (1) no latency shift for the end-to-end link; (2) CPRI link stays up during this recovery period which has to be short; and (3) avoid leading to another underrun scenario thereafter. If any of these three are violated, there will be an unstable CPRI link with repeated fluctuations to the 4G, 5G radio cell connectivity.

Hereinafter, a number of techniques to address the above stated jitter/PDV induced problems, if occurred, is presented.

One such technique includes addition of an IDLE frame for playout at the corresponding CPRI endpoint (e.g., REC 102 or RE 106) for every such instance where the actual packet which was supposed to be played out is not available in re-timer buffer for playing on CPRI link, for any of the reasons described above (i.e., packet drop, early/late arrival of packets, and/or post occurrence underrun). In one example, an IDLE frame's contents may be such that it does not result in physical coding sublayer (PCS) errors on the CPRI link. For example, the IDLE frame's contents may be such that it does not result into PCS errors on the CPRI link. CPRI stream. At the CPRI layer this could result into 1-2 line coding violations even if the original CPRI data is not byte aligned. However, that will not result into a CPRI framing loss even if several successive IDLE frames are played out. Moreover, in one example, the size of the IDLE frame may be equal to the RoE Frame size. This is to ensure that there is exactly one IDLE frame playout for any dropped frame and, to ensure that the p/q counter jump in RoE header is known and same as for every 'valid' RoE frame.

In another example, the size of an IDLE frame is equal to the size of an RoE frame in order to ensure that there is one IDLE frame playout for any dropped frame and, to ensure that the p/q counter jump in RoE header is known and same as for every 'valid' RoE frame. This techniques allows the fronthaul circuit to keep the PHY and PCS layers up and running at the CPRI end point for some duration before the upper layers on the CPRI end point can detect a problem on the link and react accordingly.

In another example and to address the problem of packets arriving late (e.g., due to a "silence followed by burst' scenario) or packets arriving early (e.g., due to a 'burst followed by silence' scenario), the following parameters are monitored. First, the last valid frame that is played out is monitored. Second, a number of IDLE frames inserted to cover for the lost/not-available packets is determined. Third, the frames stored in the de-mapper buffer are monitored. This monitoring process may occur continuously until it is time to stop the IDLE frame insertions (e.g., when a valid frame is available for playout). At this point, a'valid' frame from the buffer is chosen in such a way that playing that will ensure that the CPRI framing integrity is maintained and no hole or expansion to the CPRI framing occurs. This solution is illustrated using FIGS. 3A and 3B. These figures illustrate how to deal with late/early frame arrival scenarios by dropping the frames from the re-timer buffer (corresponding to which IDLE frames have been played out already) and choosing a 'valid' frame in buffer in such a way that the CPRI framing remains intact and there is no extra or less CPRI data played out (no expansion or gap).

Figure 3A:
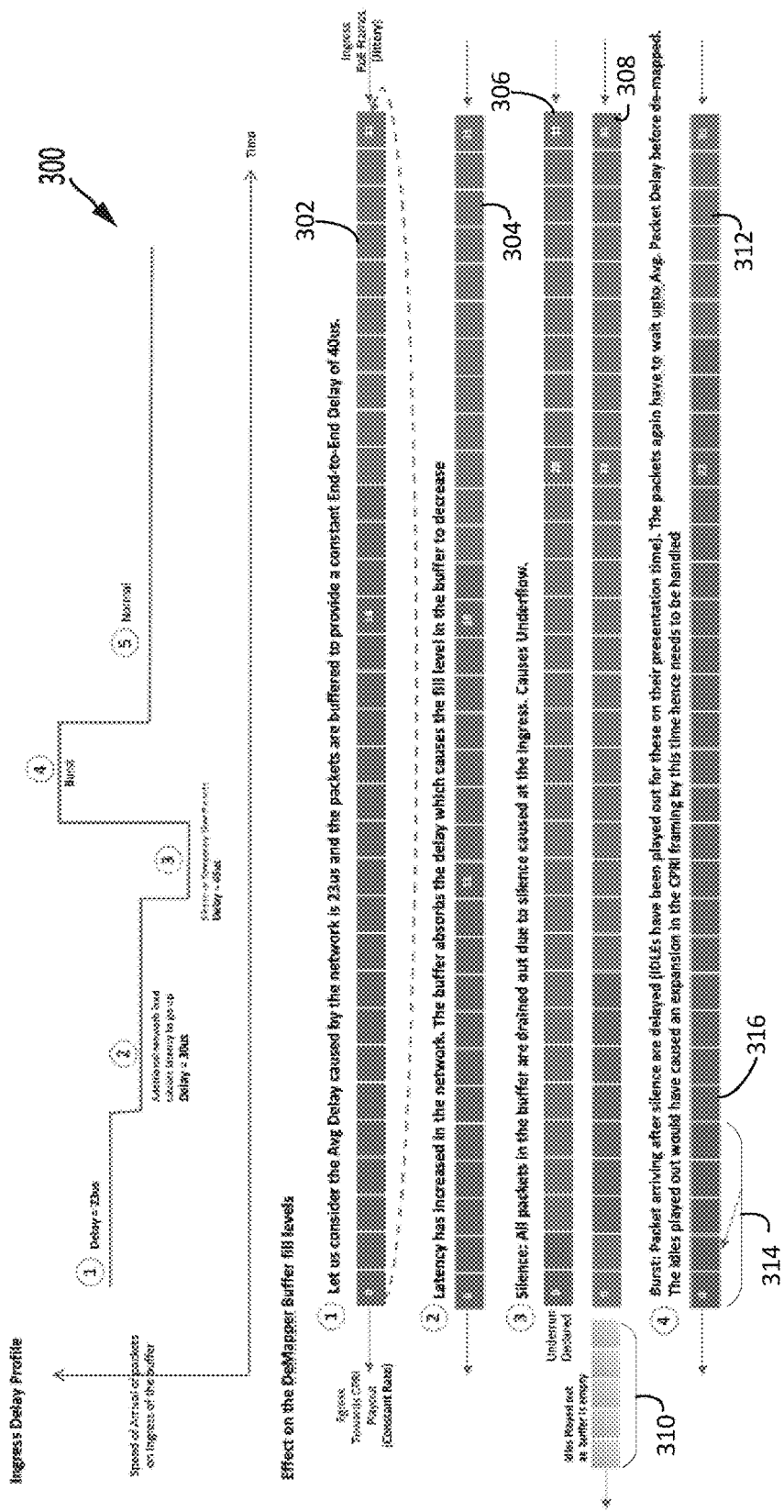
FIGS. 3A-3B illustrate techniques for addressing early/late arrival of frames at a de-mapper, according to some aspects of the present disclosure.
Figure 3B:
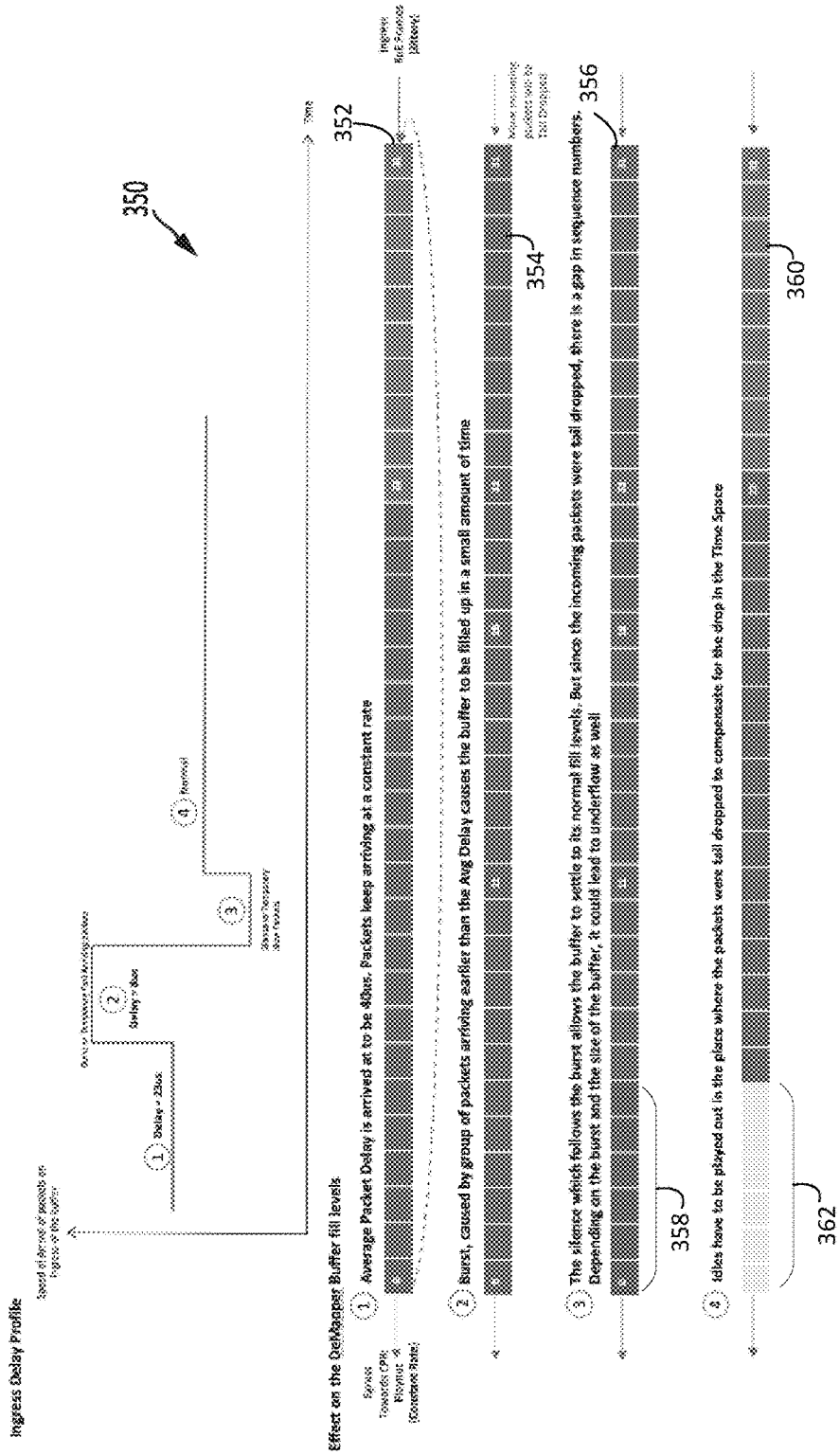

FIGS. 3A-3B illustrate techniques for addressing early/late arrival of frames at a de-mapper, according to some aspects of the present disclosure.

FIG. 3A illustrates a scenario where packets may arrival late due to, for example, a 'silence followed by burst' scenarios. Graph 300 illustrates an ingress delay profile of RoE frames arriving at a de-mapper such as one of de-mappers 114 and/or 118, in an example sequence.

At step (1), arriving frames may be experiencing a 23 µs delay. Visual state 302 of the de-mapper buffer at step (1) is shown where jittery RoE frames enter the buffer (ingress) at the left side and queued to be de-mapped to CPRI frames that exit (egress) at the right end to be played out at REC 102 or RE 106 as the case may be. In this state, the average delay caused by network is assumed to be 23 µs and packets are buffered in the buffer to provide a constant end-to-end delay of 40 µs.

At step (2), arriving RoE frames may experience additional delays due to network load (e.g., up to 30 µs). Visual state 304 shows that due to this increased latency, the available frames in the buffer decrease relative to state 302.

At state (3), due to silence in the network, additional delay is experienced by arriving frames (e.g., 45 µs). Visual state 306 shows that due to this additional delay, the buffer is drained out, which causes an underflow situation at the buffer. At this state, FIG. 3A shows another state of the buffer (visual state 308), where the buffer is completed drained out, prompting the de-mapper to play out IDLE frames 310 since the buffer is empty.

At state (4), there is a sudden burst of incoming frames as the delay is reduced (i.e., there is a burst in network 110). Visual state 312 shows a number of packets 314, for which IDLE frames 310 have been played out (in their absence). Therefore, if played upon arrival, a latency shift is introduced in the network causing an expansion in the CPRI framing. This would violate one of the constraints described above (i.e., no latency shift for the end-to-end link). In one example, packets 314 would be marked as invalid and dropped.

State 312 also shows that the buffer is suddenly filled with incoming RoE frames, each of which has to wait up to the average packet delay (e.g., 23 µs) to be de-mapped. With frames 314 dropped, frames starting with frame 316 would be de-mapped and played out once the average packet delay is met.

State (5) shown on graph 302 illustrates a return to normal transmission and arrival of RoE frames.

FIG. 3B illustrates a scenario where packets may arrival early due to, for example, a 'burst followed by silence' scenarios. Graph 350 illustrates an ingress delay profile of RoE frames arriving at a de-mapper such as one of de-mappers 114 and/or 118, in an example sequence.

At step (1), arriving frames may be experiencing a 23 µs delay. Visual state 352 of the de-mapper buffer at step (1) is shown where jittery RoE frames enter the buffer (ingress) at the left side and queued to be de-mapped to CPRI frames that exit (egress) at the right end to be played out at REC 102 or RE 106 as the case may be. In this state, the average delay caused by network is assumed to be 23 µs and packets are buffered in the buffer to provide a constant end-to-end delay of 40 µs.

At step (2), due to a burst, RoE frames arrive at the buffer earlier causing the buffer to be filled up. This is shown by visual state 354 in FIG. 3B.

At state (3) and as shown via visual state 356, the silence that follows the burst allows the buffer to settle to its normal levels. However, since incoming packets at state (2) were tail dropped (e.g., packets 358), there is a gap in sequence numbers, which can lead to an underflow.

At state (4) and as visual state 360 illustrates, IDLE frames 362 are played out in place of tail dropped frames 358 to compensate for the drop in the time space.

In some examples, a sequence number-based method may be utilized to identify the valid frame from the buffer to play out (after the IDLE frames are played out, as shown in FIGS. 3A and 3B) to ensure that their play out on the CPRI link does not impact the CPRI framing integrity and no hole or expansion to the CPRI framing occurs.

As per IEEE 1914.3 specification, each ROE frame can carry a sequence number in the form of p/q counters. The de-mapper can use this information to keep track of the last 'valid' frames played out and also how many IDLE frames have been inserted since last 'valid' frame. Using these, de-mapper can identify the 'valid' frames (which arrived later) from the re-timer buffer for which IDLE frames have been played out already and drop those. The playout can then resume from the next 'valid' frame. For example, if the last 'valid' played out frame had seq number N and 'm' IDLE frames have been played out in sequence after that due to underflow, the frame with sequence number N+'m'*'packetization factor' shall be played out. Here, the packetization factor may have a 'p-increment' value seen in successive good packets (i.e., p-increment is increment in p counter value in two successive frames monitored during link establishment in the beginning). Accordingly, any 'valid' frame present in re-timer buffer between N+1 and N+'m'*'packetization factor' is discarded from the buffer.

In another example, where the RoE header is not stored inside the buffer, a separate mapping table can be maintained to keep track of sequence number corresponding to a frame in a particular position/slot in the buffer. This list can be maintained/updated at ingress and egress of every RoE frame and is be equal to the capacity of the buffer in number of frames.

In some examples, a timestamp-based method may be utilized to identify the valid frame from the buffer to play out (after the IDLE frames are played out, as shown in FIGS. 3A and 3B) to ensure that their play out on the CPRI link does not impact the CPRI framing integrity and no hole or expansion to the CPRI framing occurs.

As per IEEE 1914.3 specification, each ROE frame can optionally carry a timestamp added by the mapper. An RoE frame may carry timestamp as well as sequence number information in the RoE frame. Using this timestamp information and the Re-timer output delay measured at the de-mapper, the de-mapper can arrive at the 'proper' playout time of an RoE frame using formula (1)

$$\text{Playout time} = \text{Egress } TS + \{\text{Re-timer output delay} - (\text{Egress } TS - \text{Ingress } TS)\} \quad \text{Formula (1)}$$

In formula (1), Egress TS is a timestamp at which RoE frame arrived at de-mapper. Re-timer output delay is a fixed delay for the frames from the Ingress TS (Timestamp put by mapper on the RoE frames) before it is played out on CPRI line. This covers (a) the Packet Delay for the packet and (b) the time frame had to spend in the buffer before playout (i.e., if the Packet Delay is small, the frame waits longer in buffer and if Packet Delay is high, the frame spends less time in buffer before playout.) Accordingly, all frames end up being played-out on the CPRI line with a fixed delay from their Ingress TS. The value of Re-timer output delay may be determined during link bring up.

In some examples, when there is a buffer underrun scenario as described with reference to FIGS. 3A and 3B, the de-mapper can keep track of how many IDLE frames have been inserted since last 'valid' frame. After every IDLE frame playout, the de-mapper can check the frame with earliest playout time (in co-relation with Re-timer output delay) whether it shall be played out or not. If playout time of the packet has elapsed, the frame can be discarded from the re-timer buffer. Accordingly, the 'valid' frame playout will resume only with the frame whose playout on CPRI link does not lead to gap/expansion in the CPRI framing in the form of hyper frame or basic frame.

In one example and in order to address the post de-mapper buffer underrun problem, the Average Packet delay during initial CPRI link establishment is monitored and used to arrive at a Re-timer output delay by also allowing for a comfortable fill levels in the buffer (e.g., if the Average Packet delay is 60 µs for N number of initial packets, and considering another 10 µs of fill in re-timer buffer, the Re-timer output delay will be equal to 70 µs allowing us to handle +/−10 µs of jitter). This information may be monitored and stored every time link is established or re-established due to any link faults.

The underrun scenario (empty buffer) would tend to affect/extend the one-way delay between the end-to-end CPRI entities as re-filling the buffer may not happen in the same time. In other words, the re-timer output delay may change during this re-filling up to same level as during initial bring-up.

To handle this, it is proposed that the 'original' Re-timer output delay is kept same even after an underrun. This means that the egress playout from the re-timer shall be resumed after the buffer is filled up to a point (not the same as used during initial link bring up) which yields the same original Re-timer output delay (e.g., in the example above, buffer fill of 10 μs was allowed but post underrun, it could be lesser or higher than 10 μs to enable egress playout using the same initial computed Re-timer output delay. Accordingly, the overall fixed delay from the buffer will be maintained.

In one example, the current average packet delay $T_{avg-underrun}$ since underrun may be measured, the buffer is allowed to fill up to the Re-timer output delay–$T_{avg-underrun}$ before starting the egress playout. Egress playout from buffer after an underrun should not be dependent on the buffer fill level but should aim to provide a same constant output delay as during link bring up by ensuring that (1) the packet arriving late due to silence after an underrun gets to be buffered for a shorter period of time; and (2) packets arriving early due to a burst after an underrun are buffered for a longer period of time.

Figure 4:
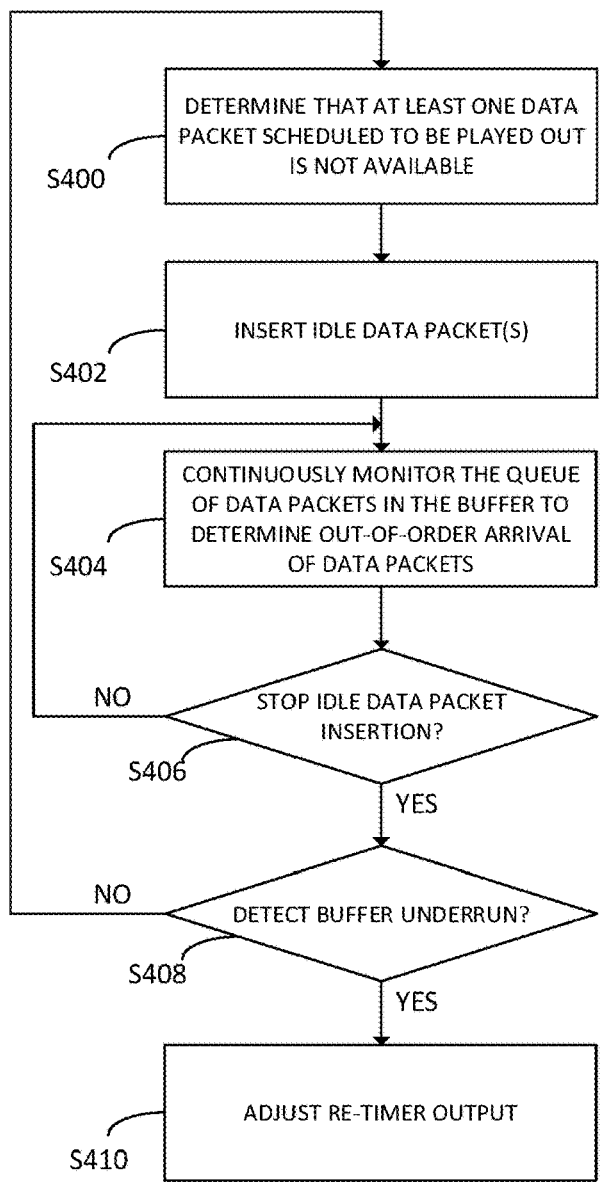
FIG. 4 describes an example process for ensuring CPRI framing integrity in view of network jitter and packet delay variations that result in a frame dropped or arrived out of order at a de-mapper, according to some aspects of the present disclosure.

FIG. 4 describes an example process for ensuring CPRI framing integrity in view of network jitter and packet delay variations that result in a frame dropped or arrived out of order at a de-mapper, according to some aspects of the present disclosure. FIG. 4 will be described from the perspective of de-mapper 114 of FIG. 1. However, the method can also be performed by de-mapper 118 of FIG. 1.

At S400, de-mapper 114 may determine that at least one data packet scheduled to be de-mapped and played out is not available (e.g., either dropped over network 110 or is arriving early/late). This determination may be performed according to any known or to be developed process. For example, the sequence number or the timestamp information in the ROE header for the frame can be used to determine that at least one data packet scheduled to be de-mapped and played out is not available. De-mapper 114 may keep track of what sequence number or the timestamp frame is being played out currently or last played out and the frame from buffer being considered for played out can be checked to determine whether it is the correct 'next' frame for playout or not. Given that the buffer is slotted, the frames in the buffer are in a sequential order and hence sequence number and/or timestamp information is used determine whether the proper frame supposed to be played out is in the buffer or not.

Throughout this disclosure, the terms data packet and a frame may be used interchangeably.

At S402, de-mapper 114 may insert an IDLE data packet (IDLE frame) into a buffer at the de-mapper for each of the ate least one data packet that is determined at S400 to be unavailable. As described above, the IDLE frame's contents may be such that it does not result into PCS errors on the CPRI link. CPRI stream. At the CPRI layer this could result into 1-2 line coding violations even if the original CPRI data is not byte aligned. However, that will not result into a CPRI framing loss even if several successive IDLE frames are played out. Moreover, in one example, the size of the IDLE frame may be equal to the RoE Frame size. This is to ensure that there is exactly one IDLE frame playout for any dropped frame and to ensure that the p/q counter jump in RoE header is known and same as for every 'valid' RoE frame.

At S404, de-mapper 114 may continuously monitor the queue at the buffer that is being de-mapped and played out on the CPRI link (may be referred to as a packet playout process) to determine out-of-order arrival of data packets (e.g., late arrival due to 'silence followed by burst' or early arrival due to 'burst followed by silence' scenarios as described above with reference to FIGS. 3A and 3B). In one example, this monitoring may be performed to (1) identify last valid data packet played out, (2) a number of idle data packets inserted, and (3) a number of data packets currently stored in the buffer. In one example, as described above, the last valid data packet played out and/or the next valid data packet to be played out after insertion of IDLE data packets may be determined using a sequence number-based method or a timestamp-based method, as described above. As part of this process, idle packets may be inserted into the buffer as needed, per the processes described above with reference to FIGS. 3A and 3B.

At S406, de-mapper 114 may determine whether IDLE data packet insertion should be stopped (e.g., because of arrival of late packets or emptying of the buffer as described above with reference to FIGS. 3A and 3B). If not, the process returns back to S404 and S404 and S406 are repeated until de-mapper 114 determines that IDLE data packet insertion should be stopped.

Once de-mapper 114 determines that IDLE data packet insertion should be stopped at S406, then at S408, de-mapper 114 may determine whether a buffer underrun (post de-mapper underrun described above) occurs.

If at S408, de-mapper 114 does not detect a buffer underrun, the process returns to S400 and S400-S408 is repeated continuously. However, if at S408, de-mapper 114 detects a buffer underrun, then at S410, de-mapper 114 may adjust a re-timer output delay of the buffer based an average data packet delay obtained from an initial CPRI link establishment and an estimated fill time for the buffer, as described above.

With example embodiments for addressing data packet (frame) unavailability either due to frames being dropped over network 110 or arriving late or early due to fluctuations in network 110 and/or any intervening buffer, to ensure CPRI framing integrity and a proper play out of CPRI frames at corresponding one of REC 102 or RE 106, the disclosure now turns to example architecture of network elements and components that may be utilized as any one of the elements in the example Fronthaul network 100 including REC 102, FH-GWs 104*a* and 104*b*, mappers 112 and 116, and/or de-mappers 114 and 118. Moreover, mappers 112, 116 and de-mappers 114 and 118 logics may be implemented in one or more integrated circuits such as a Field-Programmable Gate Array (FPGA), an Application Specific Integrated Circuit (ASIC), etc.

Figure 5:
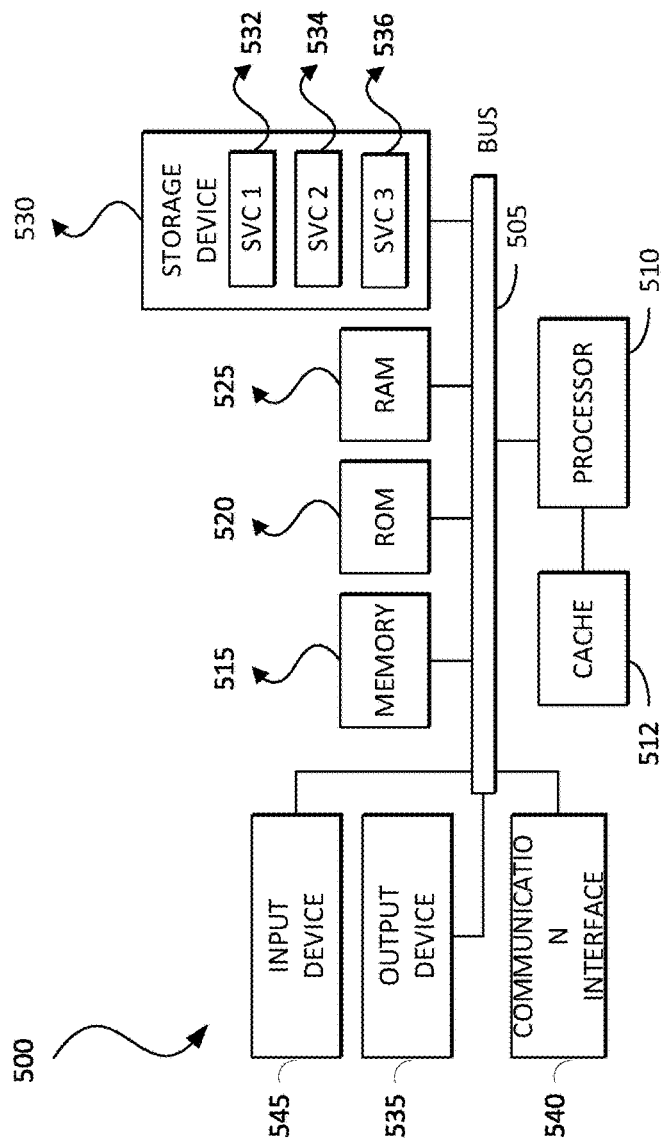
FIG. 5 illustrates a computing system architecture, according to some aspects of the present disclosure.

FIG. 5 illustrates a computing system architecture, according to some aspects of the present disclosure. Components of computing system architecture 500 are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache 512 of high-speed memory connected directly with, in close proximity to, or integrated as part of the processor 510. The system 500 can copy data from the memory 515 and/or the storage device 530 to the cache 512 for quick access by the processor 510. In this way, the cache 512 can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service (SVC) 1 532, service (SVC) 2 534, and service (SVC) 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

Figure 6:
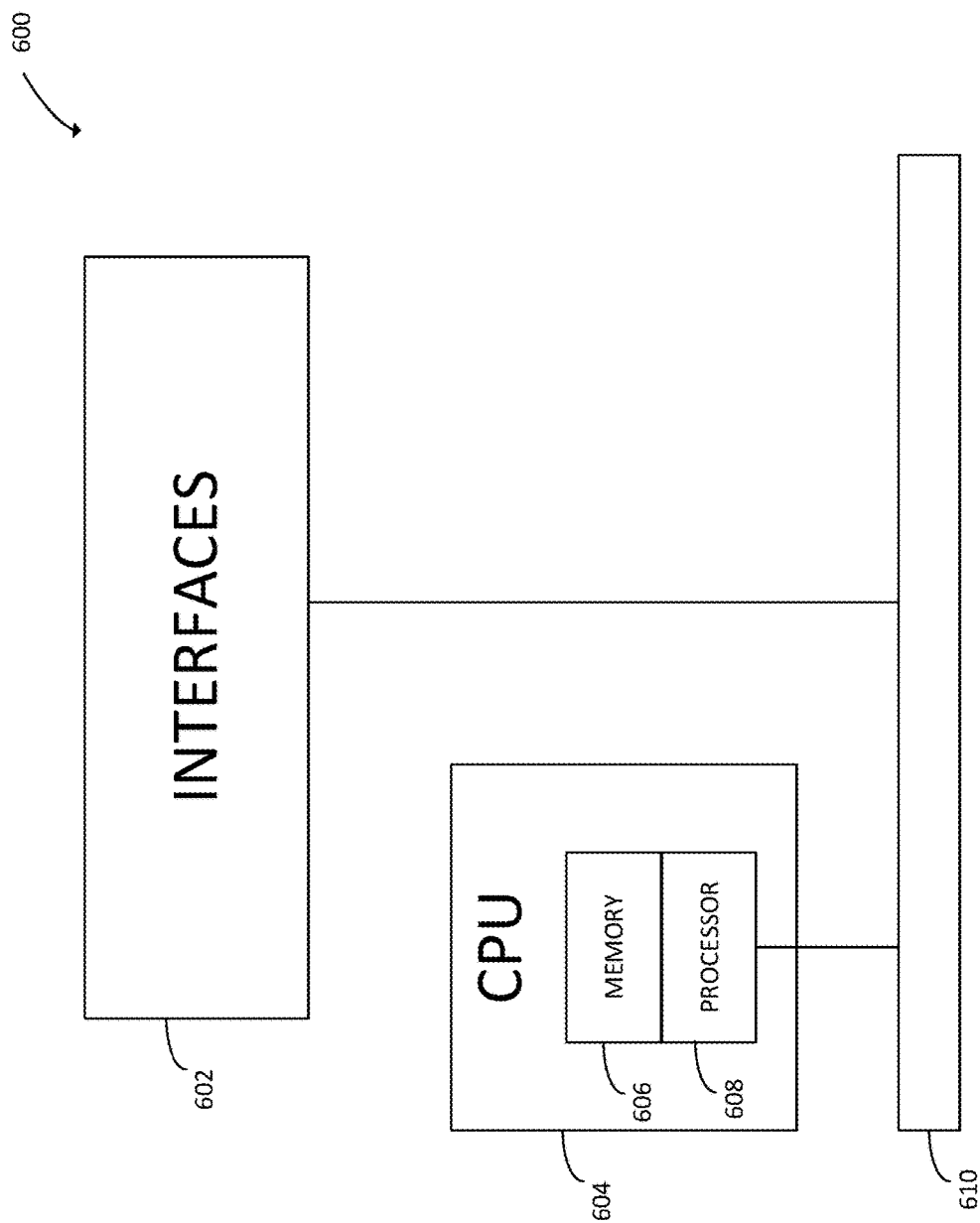
FIG. 6 illustrates an example network device, according to some aspects of the present disclosure.

FIG. 6 illustrates an example network device, according to some aspects of the present disclosure. Example network device 600 can be suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 604 to efficiently perform routing computations, network diagnostics, security functions, etc.

Although the system shown in FIG. 6 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   determining, at a de-mapper configured to receive data packets over a network, that at least one data packet scheduled to be played out is not available;
   inserting an idle data packet into a buffer at the de-mapper for each of the at least one data packet that is not available, wherein a size of the idle data packet is equal to a size of a Radio over Ethernet (RoE) frame;
   continuously monitoring, at the de-mapper, a packet play-out process to (1) identify last valid data packet played out, (2) a number of idle data packets inserted, and (3) a number of data packets currently stored in the buffer; and
   based on the continuous monitoring, determining that insertion of idle data packets into the buffer should be stopped and a valid data packet to be played out;
   wherein inserting the idle data packet and the valid data packet ensure link integrity in data packet transmission between two network elements in the network.

2. The method of claim 1, wherein content of the idle data packet does not result in PCS errors on a Common Public Radio Interface (CPRI) link between the de-mapper and one of the two network elements.

3. The method of claim 1, further comprising:
   identifying the valid data packet to be played out.

4. The method of claim 3, wherein the valid data packet is identified based on at least one of a sequence number or a timestamp associated with a corresponding ROE frame, the sequence number or the timestamp being stored in a RoE header or a mapping table.

5. The method of claim 1, further comprising:
   detecting a buffer underrun at the de-mapper.

6. The method of claim 5, wherein upon detecting the buffer underrun, the method further comprises:
   adjusting a re-timer output delay for the buffer using an average data packet delay obtained from an initial CPRI link establishment and an estimated fill time for the buffer.

7. The method of claim 1, wherein the de-mapper is part of a fronthaul gateway that converts received Ethernet packets into CPRI packets to be played out at one of a Radio Control Equipment or a Radio Equipment.

8. A de-mapper of a fronthaul network comprising:
   one or more memories having computer-readable instructions stored therein; and
   one or more processors configured to execute the computer-readable instructions to:
      determine that at least one data packet scheduled to be played out is not available;
      insert an idle data packet into a buffer at the de-mapper for each of the at least one data packet that is not available, wherein a size of the idle data packet is equal to a size of a Radio over Ethernet (RoE) frame;
      continuously monitor, at the de-mapper, a packet play-out process to (1) identify last valid data packet played out, (2) a number of idle data packets inserted, and (3) a number of data packets currently stored in the buffer; and
      based on the continuous monitoring, determine that insertion of idle data packets into the buffer should be stopped and a valid data packet to be played out;
      wherein insert the idle data packet and the valid data packet ensure link integrity in data packet transmission between two network elements in the network.

9. The de-mapper of claim 8, wherein content of the idle data packet does not result in PCS errors on a Common Public Radio Interface (CPRI) link between the de-mapper and one of the two network elements.

10. The de-mapper of claim 8, wherein the one or more processors are further configured to execute the computer-readable instructions to identify the valid data packet to be played out.

11. The de-mapper of claim 10, wherein the valid data packet is identified based on at least one of a sequence number or a timestamp associated with a corresponding ROE frame, the sequence number or the timestamp being stored in a RoE header or a mapping table.

12. The de-mapper of claim 8, wherein the one or more processors are further configured to execute the computer-readable instructions to detect a buffer underrun at the de-mapper.

13. The de-mapper of claim 12, wherein upon detecting the buffer underrun, the one or more processors are further configured to execute the computer-readable instructions to adjust a re-timer output delay for the buffer using an average data packet delay obtained from an initial CPRI link establishment and an estimated fill time for the buffer.

14. The de-mapper of claim 8, wherein the de-mapper is part of a fronthaul gateway that converts received Ethernet packets into CPRI packets to be played out at one of a Radio Control Equipment or a Radio Equipment.

15. One or more non-transitory computer-readable media comprising computer-readable instructions, which when executed by one or more processors of a de-mapper in a fronthaul network, cause the de-mapper to:
   determine that at least one data packet scheduled to be played out is not available;
   insert an idle data packet into a buffer at the de-mapper for each of the at least one data packet that is not available, wherein a size of the idle data packet is equal to a size of a Radio over Ethernet (RoE) frame;

continuously monitor, at the de-mapper, a packet playout process to (1) identify last valid data packet played out, (2) a number of idle data packets inserted, and (3) a number of data packets currently stored in the buffer; and based on the continuous monitoring, determine that insertion of idle data packets into the buffer should be stopped and a valid data packet to be played out; wherein insert the idle data packet and the valid data packet ensure link integrity in data packet transmission between two network elements in the network.

16. The one or more non-transitory computer-readable media of claim 15, wherein content of the idle data packet does not result in PCS errors on a Common Public Radio Interface (CPRI) link between the de-mapper and one of the two network elements.

17. The one or more non-transitory computer-readable media of claim 15, wherein the execution of the computer-readable instructions further cause the de-mapper to identify the valid data packet to be played out.

18. The one or more non-transitory computer-readable media of claim 17, wherein the valid data packet is identified based on at least one of a sequence number or a timestamp associated with a corresponding ROE frame, the sequence number or the timestamp being stored in a RoE header or a mapping table.

19. The one or more non-transitory computer-readable media of claim 15, wherein the execution of the computer-readable instructions further cause the de-mapper to detect a buffer underrun at the de-mapper.

20. The one or more non-transitory computer-readable media of claim 19, wherein upon detecting the buffer underrun, the execution of the computer-readable instructions further cause the de-mapper to adjust a re-timer output delay for the buffer using an average data packet delay obtained from an initial CPRI link establishment and an estimated fill time for the buffer.

* * * * *